July 5, 1966 P. F. GRAMLICH 3,259,808
GROUND LEVEL DISTRIBUTION TRANSFORMER
Filed Oct. 14, 1963 6 Sheets-Sheet 1
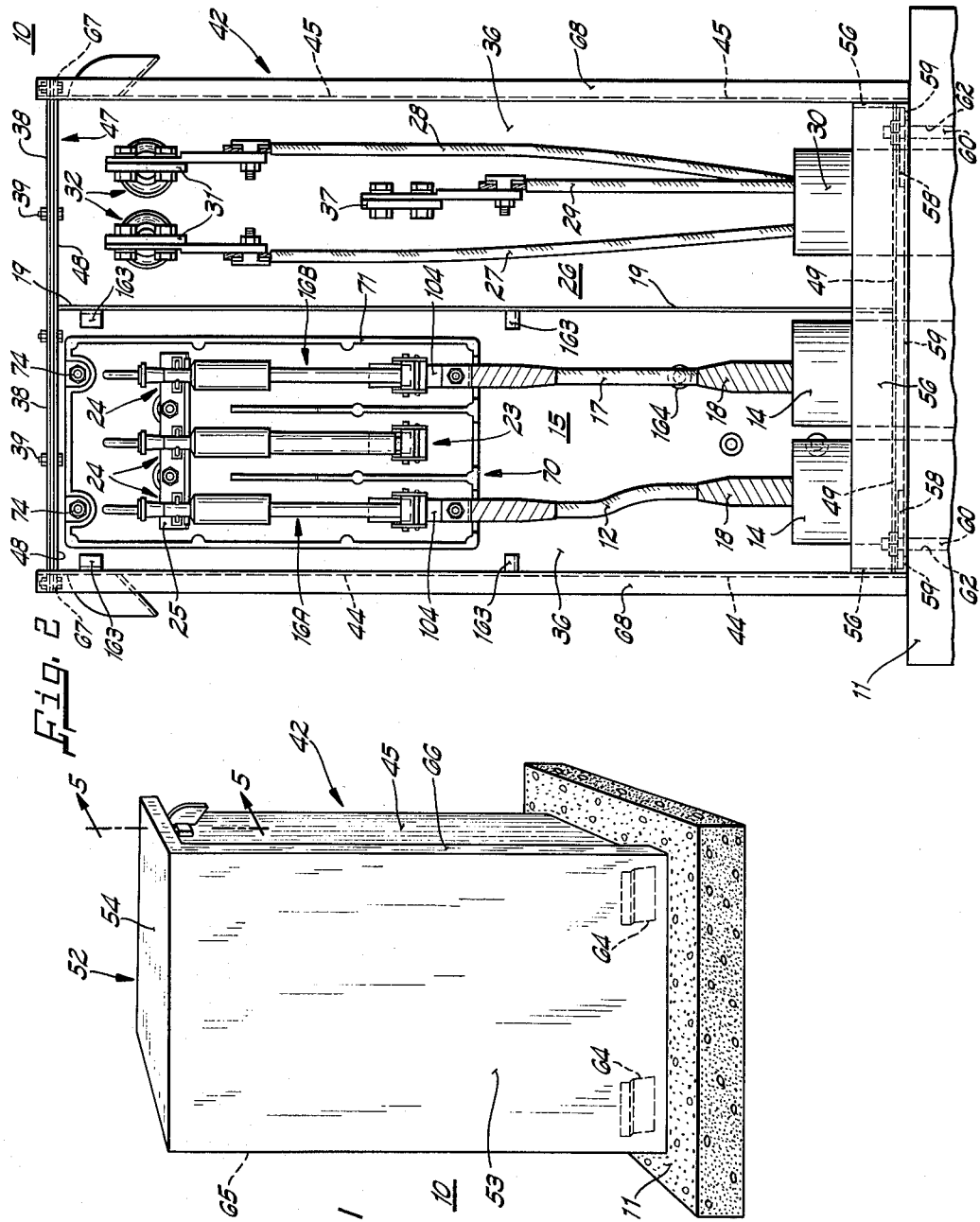
INVENTOR.
Paul F. Gramlich
BY Lee H. Kaiser
Attorney

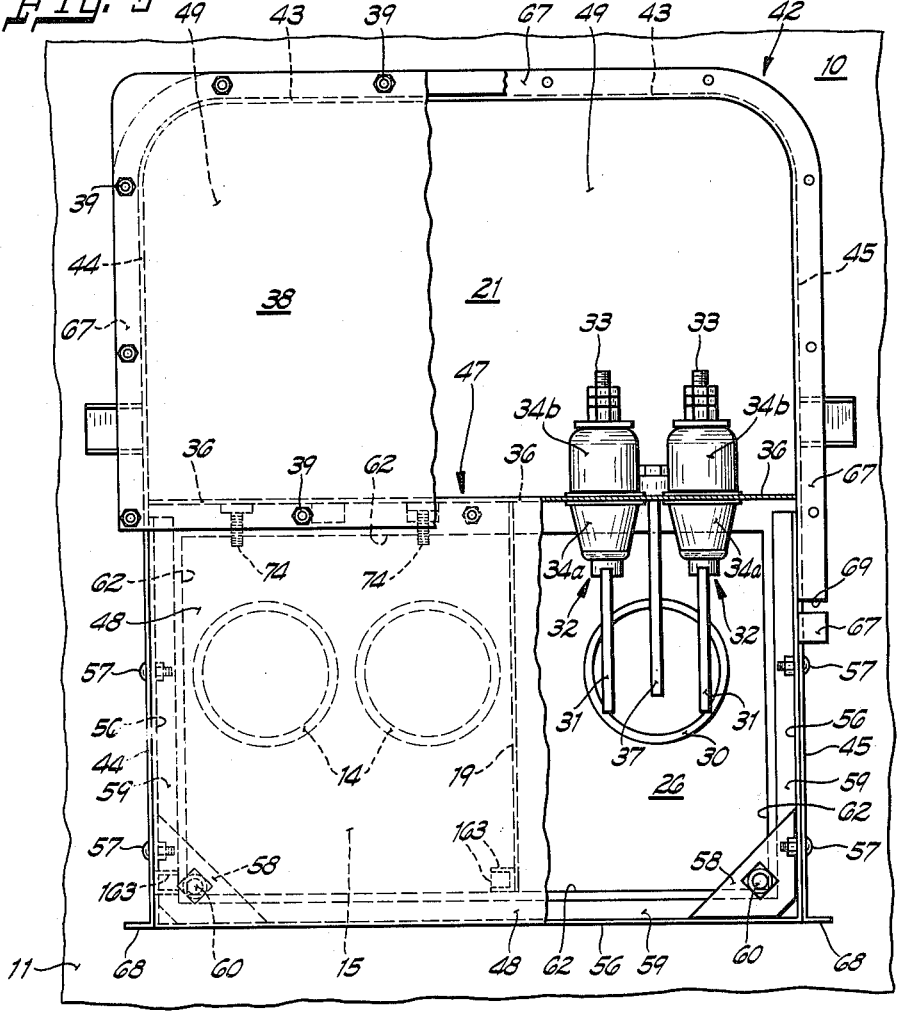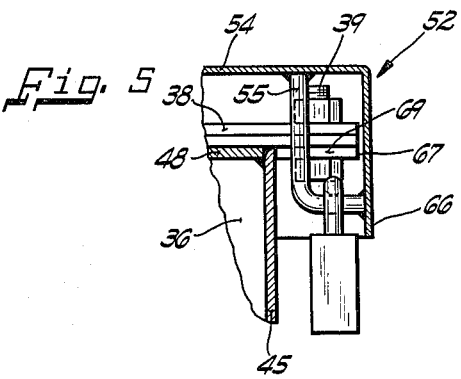

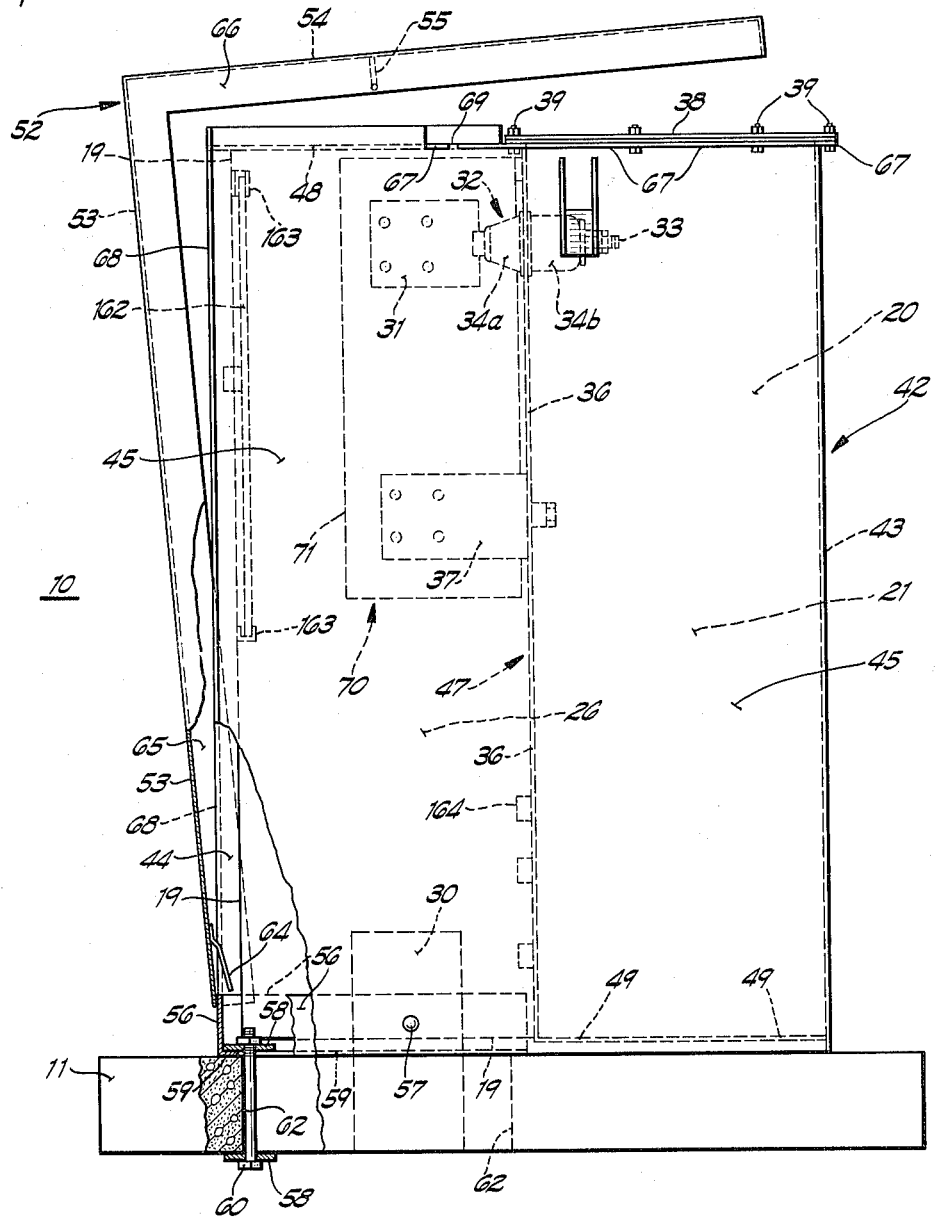

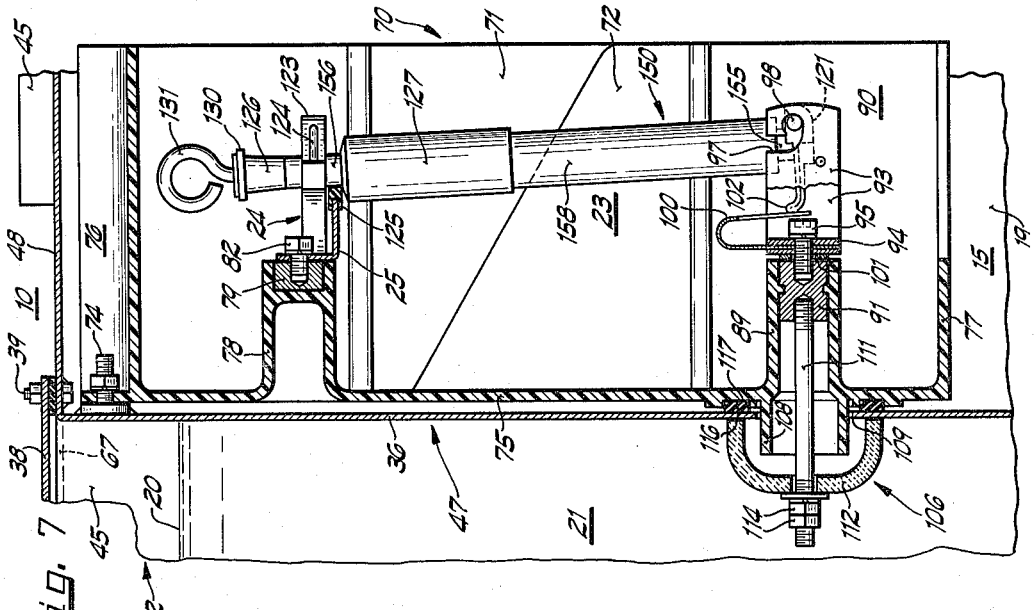

July 5, 1966 P. F. GRAMLICH 3,259,808
GROUND LEVEL DISTRIBUTION TRANSFORMER
Filed Oct. 14, 1963 6 Sheets-Sheet 5

INVENTOR.
Paul F. Gramlich
BY Lee H. Kaiser
Attorney

July 5, 1966  P. F. GRAMLICH  3,259,808
GROUND LEVEL DISTRIBUTION TRANSFORMER
Filed Oct. 14, 1963  6 Sheets-Sheet 6

INVENTOR.
Paul F. Gramlich
BY Lee H. Kaiser
Attorney

United States Patent Office 3,259,808
Patented July 5, 1966

3,259,808
GROUND LEVEL DISTRIBUTION TRANSFORMER
Paul F. Gramlich, Zanesville, Ohio, assignor to McGraw-Edison Company, Milwaukee, Wis., a corporation of Delaware
Filed Oct. 14, 1963, Ser. No. 315,762
25 Claims. (Cl. 317—103)

This invention relates to ground level distribution transformers.

Overhead electrical distribution systems are aesthetically displeasing and detract from the beauty of residential areas. In an attempt to improve the aesthetic appearance of distribution systems, electric utilities have installed buried cable with distribution transformers enclosed in metallic housings supported on concrete pads at ground level. Such an underground distribution system minimizes the problem of wind, ice, and tree limb damage and reduces the likelihood of lightning damage. However, the relatively high cost of an underground distribution system with metallic transformer housings on concrete pads in comparison to overhead, the concern of safety with the high voltage transformer at ground level where it is readily accessible to children, and the difficulty of disconnecting the ground level transformer, which is not provided with the conventional fuse cutout, underload, have discouraged more widespread adoption of underground distribution systems for residential service. Some prior art ground level transformers require auxiliary load break devices to interrupt the load current to the transformer, thereby necessitating special contact means to engage the auxiliary load-break device and requiring that the ground level housing be of increased size to permit operation of the auxiliary load-break device within the housing. Other known ground level transformers did not have sectionalizing switches and required a stand-off porcelain insulator within the switching compartment to which an energized incoming cable was temporarily connected whenever connections to the transformer were being changed, while still others used fuses under the oil to protect the transformer which contaminated the oil, created a fire hazard, and sometime required untanking the transformer for re-fusing. Ground level transformer housings have been provided with internally mounted expulsion fuses of the boric acid type within the switching compartment of the housing. Such fuses in operating to interrupt fault current evolve great quantities of ionized hot gas which tend to distort the enclosure, and sound like an explosion, making it unpleasant and dangerous for the lineman to operate the fuse even with a hookstick. Known metallic transformer casings for mounting on ground level concrete pads are expensive to construct and install, are large and bulky in appearance, and are not completely tamperproof. Further, the doors and switching compartments of prior art ground level metallic transformer casings make it inconvenient, difficult and often dangerous for the operator to gain access to the transformer core and coil assembly, to make connections to the primary and secondary bushings, to construct stress relief terminations to the primary underground cables, and to operate sectionalizing switches. Some ground level distribution transformer housings are constructed of separate tank and switching compartments held together by bolts which must be unthreaded to permit access to the handhole cover, and other housings have hinged doors, some of which are of hinged L-shaped construction, that catch the wind and must be braced when making connections to the transformer or operating the sectionalizing switches.

It is an object of the invention to provide a distribution transformer construction for mounting on a ground level concrete pad which, in comparison to prior art apparatus, is more compact in size, reduced in weight, more aesthetically pleasing, lower in cost, and requires a smaller concrete pad for mounting. It is a further object to provide such a distribution transformer construction wherein the transformer primary current can be easily interrupted by the operator with only minor evolution of gas, without appreciable noise, and with complete safety to the operator. A still further object of the invention is to provide such a ground level distribution transformer construction which is completely tamperproof and wherein all bolts to the handhole cover providing access to the oil-filled container for the transformer core and coil assembly are completely covered, but which eliminates hinged doors and permits complete and convenient access to both high and low voltage compartments and to the handhole cover by the opening of a single lock and removal of a single member which forms the front and top of the housing. Still another object of the invention is to provide such a housing wherein the transformer tank and switching compartment are in a unitary assembly which is constructed of only two formed pieces, which may be lifted as one piece and placed on the concrete pad, and which does not require loosening of bolts and separation of the tank from the switching compartment to permit the operator to gain access to the core and coil assembly. It is a further object to provide such a ground level distribution transformer wherein the fuse is of the current limiting, non-expulsion type which limits the current to magnitude smaller than the available system short circuit current and consequently reduces the arc energy and mechanical forces present during fault current interruption in comparison to prior art construction. Another object is to provide such a ground level distribution transformer wherein the sectionalizing loadbreak switches are an integral part of the switching compartment and literally strangle the arc with a minimum of released gases, thus obviating the necessity of auxiliary load break devices and special terminals and increased size of the housing to permit operation of the auxiliary load break device as required in prior art apparatus to interrupt load current. Still another object of the invention is to provide a molded insulating housing for the disconnect fuse and switches wherein the barriers and support insulators are integral with the housing and the spacing between switches and fuse and between these members and the ground plane are materially reduced in comparison to prior art apparatus. A still further object of the invention is to provide a unitary assembly of insulating housing and primary fuse and primary load break sectionalizing switches which may be constructed separately from the transformer tank and wherein the insulating housing is of a material having exceptionally high dielectric strength and arc suppressing and anti-tracking characteristics that minimize probability of destructive flashover to grounded parts and permit substantial reduction in the size of the switching compartment and the transformer housing.

These and other objects and advantages of the invention will be more readily apparent from the following detailed description when taken in connection with the accompanying drawing wherein:

FIG. 1 is a front perspective view of a ground level distribution transformer embodying the invention;

FIG. 2 is a front elevation view similar to FIG. 1 with the housing cover removed;

FIG. 3 is a plan view of the unitary tank and switching compartment assembly of the embodiment of FIG. 1 with the housing cover removed and the primary switch insulating housing and the transformer core and coil assembly and the cables omitted;

FIG. 4 is a side elevation view of the ground level transformer of FIG. 1 with the housing cover partially removed and the handhole cover bolted in place;

FIG. 5 is a detail view taken along line 5—5 of FIG. 1;

FIG. 6 is a partial front view of the primary compartment of the embodiment of FIG. 1 showing the novel sectionalizing switch and disconnect fuse arrangement;

FIG. 7 is a view taken along line 7—7 of FIG. 6;

Figure 11:
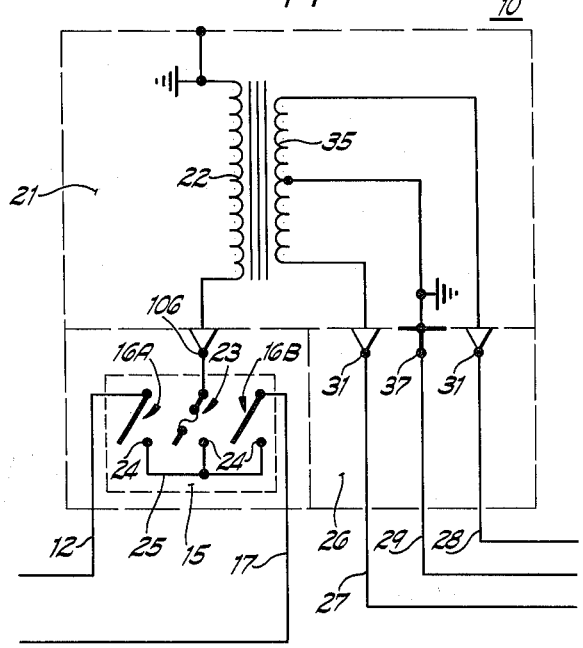
FIG. 11 is a schematic wiring diagram of the distribution transformer of the invention.

Referring to the drawing, the ground level distribution transformer of the invention is intended for underground distribution service to residential areas and includes a metallic housing 10 supported on a concrete pad 11 at ground level. Because of the difficulty of isolating cable failure and the high expense of digging up the buried cable in the event of failure, an underground distribution system may be of the loop feed type with an incoming primary underground jacketed cable 12 (see FIG. 2) extending through a conduit 14 in the concrete pad 11 and into the primary compartment 15 in housing 10 and connected through a stress grading cone 18 to a sectionalizing switch 16A and also with an outgoing underground primary jacketed cable 17 extending through a second conduit 14 in the concrete pad 11 into the primary compartment 15 and connected through a stress grading cone 18 to a second sectionalizing switch 16B. The transformer core and coil assembly (not shown) is immersed in an insulating and cooling dielectric liquid 20 within a sealed compartment 21 (see FIGS. 3 and 4) in housing 10, and the primary winding 22 (see FIG. 11) of the transformer core and coil assembly may be electrically connected through a fuse disconnect 23 disposed in primary compartment 15 to a stationary jaw contact 24 which is electrically commoned through a bus bar 25 to the stationary jaw contacts 24 of the sectionalizing switches 16A and 16B, thus permitting the incoming primary cable 12 to be connected to the primary winding 22 when switch 16A and disconnect fuse 23 are closed and switch 16B is open; to permit both incoming and outgoing primary cables 12 and 17 to be connected to the transformer primary winding 22 when switches 16A and 16B and disconnect fuse 23 are all closed; to permit the outgoing primary cable 17 to be connected to primary winding 22 when switch 16B and disconnect fuse 23 are closed and switch 16A is open; or to permit the incoming and outgoing primary cables 12 and 17 to be connected together and disconnected from the transformer primary winding 22 when switches 16A and 16B are closed and disconnect fuse 23 is open as described in detail hereinafter. The sectionalizing switches 16A and 16B and the fuse disconnect 23 interrupt primary current to the transformer under load without the evolution of a large quantity of gas and without appreciable noise.

A baffle 19 within housing 10 may separate primary compartment 15 (see FIGS. 2 and 3) from a secondary compartment 26 within housing 10. A plurality of underground secondary cables, two of which 27 and 28 are shown in the drawing, leading to nearby residences and a neutral underground cable 29 may extend through a conduit 30 in concrete pad 11 into the secondary compartment 26 in housing 10. The secondary cables 27 and 28 may be connected to spade type terminals 31 on secondary insulating bushings 32 which extend through a vertical metallic plate 36 that forms one sidewall of sealed compartment 21 and separates the sealed compartment 21 and the transformer core and coil assembly (not shown) contained therein from the primary and secondary switching compartments 15 and 26. Secondary insulating bushings 32 may have conducting studs 33 extending axially through a female porcelain member 34a of secondary bushing 32 disposed against one side of plate 36 with a gasket compressed therebetween and having a reduced diameter shank extending through a clearance aperture in plate 36 and mating with a male porcelain member 34b of secondary bushing 32 disposed against the other side of plate 36 with a gasket compressed therebetween. Conducting studs 33 may be electrically connected at one end to the spade type terminals 31 and at the other end to the transformer secondary winding 35 (see FIG. 11) within sealed liquid-filled compartment 21. The neutral cable 29 may be connected to a spade type grounding terminal 37 which is mounted on and electrically connected to vertical metallic plate 36. A handhole cover 38 held in place by bolts 39 (see FIG. 4) closes the upper end of the sealed liquid-filled compartment 21 and provides ready access to the transformer core and coil assembly (not shown).

Housing 10 is more compact in size and lower in weight than known ground level distribution transformer enclosures and permits reduction in the size of the concrete pad 11. Housing 10 occupies a space only approximately two by two by three feet and yet accommodates all distribution transformers up to 50 kva., and such standardization in size results in substantial cost saving. Housing 10 includes a unitary transformer tank and switching compartment assembly constructed of only two formed metal pieces, namely: (1) a generally U-shaped member 42 disposed in vertical planes which forms the backwall 43 (see FIGS. 3 and 4) and two side walls 44 and 45 of the housing 10 and defines three side walls of the sealed compartment 21 and the side walls of the primary and secondary compartments 15 and 26, and (2) a generally Z-shaped member 47 having vertical plate portion 36 as the mid-piece and forming the fourth side wall for the sealed compartment 21 and upper and lower end pieces 48 and 49 in horizontal planes and forming respectively the top wall of the primary and secondary compartments 15 and 26 and the bottom wall for the sealed compartment 21. The Z-shaped member 47 is disposed within and welded to the U-shaped member 42 intermediate the ends of the legs thereof and along the edges of the upper and lower end pieces 48 and 49 on the middle piece 36. The unitary transformer tank and switching compartment assembly formed by the members 42 and 47 may be lifted as one piece and placed on concrete pad 11. The housing 10 includes a third formed metal piece, namely an inverted L-shaped cover 52 which defines the front and top walls 53 and 54 of the housing and normally closes the primary and secondary compartments 15 and 26 and prevents access to the handhole cover 38.

Ground level transformer housings are often formed of separately constructed transformer tank and switching compartment held together by bolts, and it will be appreciated that the disclosed one-piece tank and switching compartment assembly constructed from only two pieces of formed metal, together with the one-piece cover 52, greatly simplifies the housing and reduces the cost thereof.

A removable U-shaped sill 56 (see FIGS. 2–4) of angle cross section is disposed at the lower end along the front wall 53 of housing 10 with the legs of U-shaped sill 56 disposed adjacent and secured to the housing side walls 44 and 45 (formed by U-shaped member 42) by bolts 57. The sill 56 may be removed to prevent having to lift the housing 10 over the conduits 14 and 30 and the primary and secondary cables during installation on concrete pad 11. This eliminates special lifting trucks required by the electric utility for prior art housings and reduces installation cost. The sill 56 may be secured to concrete pad 11 by triangular clips 58 which fit over the horizontally extending leg 59 of the angle cross-section sill 56 and are affixed by anchor bolts 60 to the pad 11. If desired, a generally rectangular conduit opening 62 may be provided in concrete pad 11 for conduits 14 and 30, and similar triangular clips 58 may be inserted beneath the concrete pad when it is poured and be provided with apertures to receive the anchor bolts 60. The unitary tank and switching compartment assembly may be slid over the conduit opening 62 and affixed by the bolts 57 to the sill 56.

Cover 52 has a pair of inverted generally L-shaped members 64 (see FIGS. 1 and 4) welded thereto adjacent its lower end adapted to fit over the sill 56 and releasably secure the lower end of L-shaped cover 52 to housing 10 so that it may be disengaged therefrom by merely lifting the cover 52 after the padlock is removed. Members 64 also prevent improper closure of cover 52. The edges 65 and 66 of cover 52 are bent parallel to the housing sidewalls 44 and 45 so that they overlap the sidewalls, and also the top and vertical edges 67 and 68 of the U-shaped member 42 are bent in an outward direction to interfere with the insertion of foreign objects into the housing 10. A slit 69 provided in the outwardly bent edge 67 of U-shaped member 42 receives a padlock eye 55 affixed to the bottom surface of the horizontal portion of the inverted L-shaped cover 52. When cover 52 is in place and a padlock is inserted through eye 55, the cover 52 is securely engaged with the unitary tank and switching compartment assembly in a position wherein the handhole cover 38 and the bolts 39 are concealed. Unlocking of a single padlock and lifting the unitary cover 52 provides easy access to the handhole without doors to brace against the wind as a prior art ground level distribution transformer housings.

The sectionalizing switches 16A and 16B and fuse disconnect 23 each permit interruption of full primary load current or magnetizing current without the evolution of significant hot exhaust gases, without dangerous arcing, and without noise, and the primary load-break switches, fuse, and line terminals are contained within a unitary primary switching assembly 70 which may be constructed separately from the metal housing 10. The sectionalizing switches 16A and 16B and the disconnect fuse 23 are outside the oil-filled compartment 21 where they give visual indication of switch position and do not draw arcs under oil to contaminate the oil and thus do not constitute a fire hazard. The transformer need not be untanked for re-fusing since the fuse disconnect 23 eliminates the need for a primary fuse link in the transformer compartment 21. The transformer can be isolated and the transformer core and coil assembly removed from the metallic housing without disturbing the connections to the underground primary and secondary cables.

Primary switching assembly 70 includes a switch housing 71 (see FIGS. 2, 4, and 6–8) of molded, mechanically strong, high dielectric strength, anti-tracking and arc suppressing insulating material positioned within primary compartment 15 and supporting the sectionalizing switches 16A and 16B and the fuse disconnect 23, and in the preferred embodiment of the invention switch housing 71 is of a composition comprising a water insoluble binder and a substance selected from the class consisting of the oxides and hydrates of aluminum and magnesium. One composition suitable for molding switch housing 71 is 65 percent aluminum hydrate filler, 20 percent polyester resin binder, and approximately 15 percent glass fiber. The active arc suppressing and anti-tracking dielectric material may be commercial grade aluminum hydrate $Al(OH)_3$, magnesium hydrate $$Mg(OH)_2$$

an oxide of aluminum such as alumina $Al_2O_3$, or magnesium oxide. The composition may also include other fillers such as mica, glass fiber, asbestos, or silica which reduce cost and increase mechanical strength. The binders may be organic or inorganic, although the materials utilizing organic binders are generally stronger but more expensive. Desirable characteristics are obtained when the binder comprises from 10 to 40 percent by weight of the composition, although superior results are obtained with the lower percentages of the binder. In addition to or in place of polyester resin, other resins such as phenolic, urea, melamine, and silicone resins may be employed as the binder of the molding composition. Another example of a composition suitable for the invention is 60 percent aluminum trihydrate, 20 percent polyester resin, and 20 percent glass fiber. Cold molding or hot molding may be utilized to form the switch housing 71, and the compositions are cured at a temperature of approximately 400° F. A reduction in the percent of glass fiber decreases mechanical strength but permits increase in the amount of the aluminum hydrate and thus improves the anti-tracking and arc-suppressing characteristics of the material.

The primary sectionalizing switches 16A and 16B and the fuse disconnect 23 are mounted in the switch housing 71 and separated by vertically extending barriers 72 (see FIGS. 6 and 7) molded integrally with housing 71 which isolate the fuse disconnect 23 from the sectionalizing switches 16A and 16B. The high dielectric strength switch housing 71 of anti-tracking and arc-suppressing insulating material permits a substantial reduction in spacing between the fuse 23 and the sectionalizing switches 16A and 16B and between these members and the ground plane formed by metallic housing 10 in comparison to prior art constructions while permitting the fuse 23 to provide optimum short circuit protection and the sectionalizing switches 16A and 16B to break load current with only a hookstick. The high dielectric strength material of switch housing 71 assures that no cracks or voids are present through which the high potential can sparkover to the ground plane formed by metal housing 10, and the anti-tracking and arc-supressing characteristics of the material assures that flashover does not occur along the surface of the housing between the fuse and the sectionalizing switches or between these members and the grounded metallic housing 10 even though the spacing therebetween is substantially reduced in comparison to prior art construction. The material of the preferred embodiment in the presence of an arc apparently releases water and carbon forming carbon monoxide and carbon dioxide and tending to blow off any carbon particles deposited thereon and thus prevent formation of a conducting carbon path on the surface.

The upper end of switch housing 71 is affixed adjacent the upper and of plate portion 36 by studs 74 (see FIGS. 2, 3, 6 and 7) welded to plate 36 which extend through clearance apertures in the bottom wall 75 of switch housing 71 into elongated depressions 76 molded in the upper wall of switch housing 71. A pair of bosses 78 molded integrally with housing 71 extend upwardly from bottom wall 75 and have threaded metallic inserts 79 molded in the upper end thereof. Common metallic bus bar 25 for the stationary jaw contacts 24 of disconnect fuse 23 and disconnect switches 16A and 16B is supported on the bosses 78 and secured thereto by bolts 82 engaging the threaded inserts 79. Three metallic stationary contact jaws 24 are secured to bus bar 25 by rivets.

Three bosses 89 (see FIGS. 7 and 8) molded integrally with switch housing 71 extend upwardly from bottom wall 75 in vertically spaced relation from the stationary switch jaws 24 and support switch hinge contacts 90 thereon. Metallic threaded inserts 91 are molded at the upper end of bosses 89. Each switch hinge contact 90 includes a metallic U-shaped member 93 having the web 94 thereof secured to metallic insert 91 by a bolt 95. The legs of U-shaped member 93 have bayonet slots 97 which slidably and pivotally receive the trunnions 98 of a sectionalizing switch 16A or 16B or fuse disconnect 23. Each bolt 95 also clamps one end of U-shaped contact spring 100 between the web 94 of U-shaped member 93 and a washer 101 disposed above metallic insert 91 in surrounding relation to bolt 95. Contact spring 100 provides high pressure engagement with contact finger 102 on the sectionalizing switches 16A and 16B and the disconnect fuse 23 as described in detail hereinafter, and it will be appreciated that disconnect fuse 23 and switches 16A and 16B can be interchangeably mounted on the hinge contacts 90 and closed into engagement with the stationary jaw contacts 24.

The outer hinge contacts 90 for the sectionalizing switches 16A and 16B include depending line terminals 104 (see FIGS. 2, 6 and 8) for the incoming and outgoing primary underground cables 12 and 17, and each line terminal 104 includes a metallic plate member 105 clamped by bolt 95 against a boss 89 and a threaded connector bolt 107 engaging connector member 105. The lowermost side wall 77 of switch housing 71 is recessed opposite the outer hinge contacts 90 to receive the incoming and outgoing primary underground cables 12 and 17. The middle hinge contact 90 for disconnect fuse 23 does not include a line terminal but rather is connected to the transformer primary winding 22 within sealed compartment 21 through a primary insulating bushing 106. The middle one of the three bosses 89 is tubular and in alignment with a tubular boss 108 molded integrally with switch box 71 and protruding below the bottom wall 75 and through an aperture 109 in plate 36 into the sealed compartment 21. Metallic insert 91 molded within middle boss 89 has threaded apertures in its upper and lower ends, and a conductor stud 111 for insulating bushing 106 extends axially through tubular bosses 89 and 108 and has one end threadably engaging metallic insert 91. The other end of conductor stud 111 extends through an aperture in a generally hemispherical bushing member 112 of suitable insulating material such as porcelain and into sealed compartment 21, and nuts 114 engaging said other end of conductor stud 111 clamp bushing member 112 against the surface of plate 36 within sealed compartment 21 and also compress an annular resilient gasket 116 between the external surface of plate 36 and the bottom wall 75 of switch housing 71. Gasket 116 is confined within annular groove 117 molded in the bottom wall 75 of switch housing 71 and provides a hermetic seal for compartment 21 at insulating bushing 106. The portion of the bottom wall 75 of switch housing 71 surrounded by gasket 116 and the middle boss 89 supporting the hinge contact 90 for the disconnect fuse 23 may be impregnated with a suitable waterproof material such as epoxy resin to assure that no oil leaks from the sealed compartment 21 through switch housing 71.

The novel disconnect switch 16 and fuse 23 are disclosed and claimed in the copending application of Harvey W. Mikulecky, Serial No. 298,882, filed July 31, 1963 entitled "Electrical Switch" and having the same assignee as the present invention. These load break disconnect devices 16 and 23 permit interruption of currents up to 200 amperes at voltage ratings up to 8000 volts, thereby permitting interruption of full load transformer current and also full load current on the feeder cable of the loop type system with only minor evolution of hot ionized gases, without danger of inconvenience to the lineman, and without arcing horns and auxiliary load break devices as were required with prior art apparatus. The current limiting fuse 23 silently interrupts any short-circuit current through 12,000 amperes symmetrical and 18,000 amperes asymmetrical on the transformer without explosion-like noise which characterized prior art apparatus and without the release of any hot gas or arc products.

Each load break sectionalizing switch 16A and 16B includes an elongated tubular movable switch member 120 (see FIGS. 6, 8 and 9) of high conductivity material such as copper carrying a metallic hinge member 121 adjacent its lower end secured thereto by a pin. Hinge member 121 has trunnions 98 integral therewith adapted to fit within bayonet slots 97 in U-shape member 93 of hinge contact 90 to pivotally mount movable switch member 120 and also has a pair of contact fingers 102 integral therewith adapted to bear against contact spring 100 with high pressure when the switch 16 is pivoted into closed position with stationary jaw contact 24. Each stationary contact jaw 24 has a pair of opposed contact fingers with outwardly flared ends 123 for guiding the free end of switch blade 120 into closed position, and each contact finger has a longitudinal embossment 124 which assures the blade 120 will snap into closed position. Bus bar 25 carries an elongated latch release bumper 125 on the surface thereof facing the switch blades of the disconnect switches 16A and 16B and the fuse 23.

An arc extinguishing assembly is carried adjacent the end of movable switch blade 120 and includes an inverted frusto-conical plug 126 (see FIGS. 6–10) of insulating material affixed to the upper free end of movable switch member 120 and a sleeve 127 of insulating material slidably surrounding movable switch member 120 and resiliently urged toward plug 126 by a helical compression spring 128. The plug 126 and the sleeve 127 are preferably of the same arc-suppressing and anti-tracking material as the switch housing 71, but other insulations such as polytetrafluorethylene, fiber, and the material sold under the trademark nylon are satisfactory to obtain certain of the improved results of the invention. Tapered plug 126 fits into the end of tubular movable switch member 120 without discontinuity in the surfaces thereof and is secured thereto by suitable means such as epoxy resin. A stop flange 130 is integrally formed at the upper end of plug 126. A pulling eye 131 is secured to plug 126 and has a stem 132 embedded within and completely surrounded by plug 126 so that the eye 131 is electrically insulated from metallic movable swtich member 120. In alternative embodiments eye 131 is of insulating material and molded as an integral part of plug 126. In the closed position of switch 16, the contact fingers of stationary jaw contact 24 engage the tubular movable switch member 120 below its juncture with insulating plug 126.

Insulating sleeve 127 surrounds movable switch member 120 and has an annular upper wall 135 (see FIGS. 9 and 10) and a tubular re-entrant portion 136 in telescoped sliding engagement with movable switch member 120. Spring 128 is compressed between end wall 135 and a washer 138 surrounding tubular movable switch member 120 and supported against downward movement by a pin 139 extending transversely through movable switch member 120. Spring 128 urges sleeve 127 toward the plug 126, but this movement is normally prevented by a latch spring 141 having a generally U-shaped body portion 142 disposed within tubular movable switch member 120 and a latch release tip 144 extending radially outward therefrom through a longitudinal slot adjacent the upper end of movable switch member 120.

Figure 9:
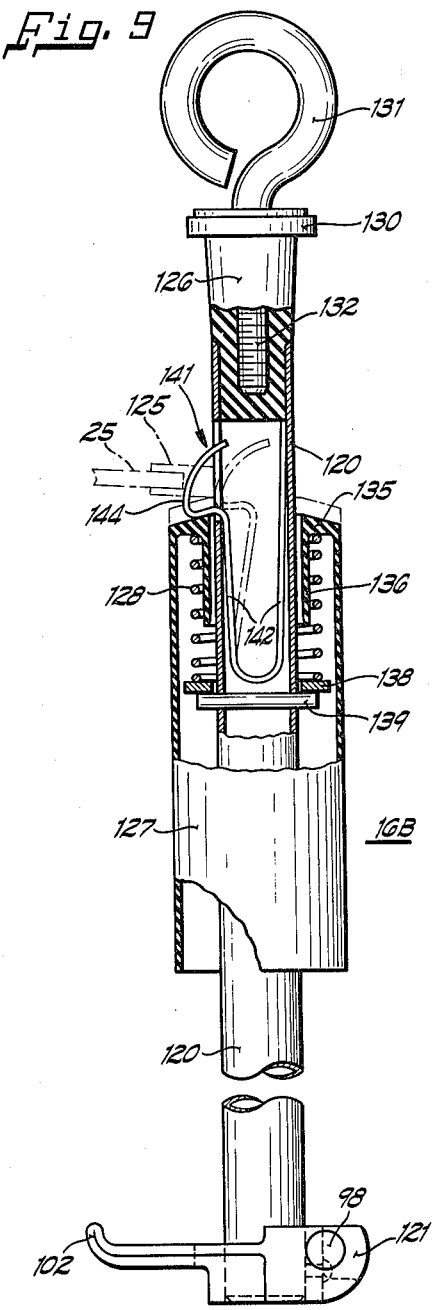
FIG. 9 is a cross-section view through the disconnect switch shown in FIGS. 6 and 8.
Figure 10:
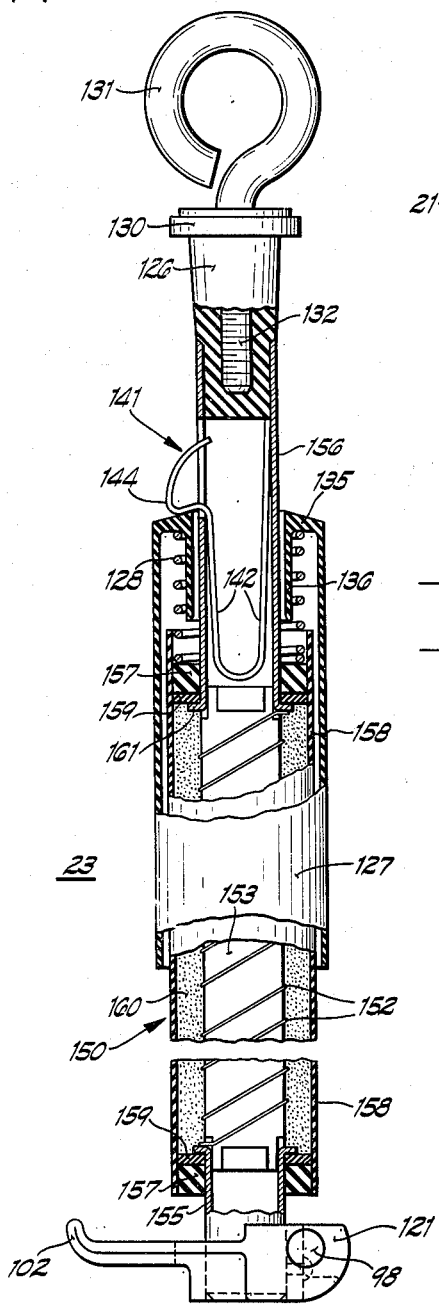
FIG. 10 is a cross-section view through the load break protective fuse shown in FIGS. 6 and 7.

When switch 16 is open, the sleeve 127 may be manually reset by moving it down switch movable member 120 until it is held against movement by latch spring 141 in the reset position shown in full lines in FIG. 9. As switch movable member 120 is pivoted into engagement with a stationary contact jaw 24 and snaps past the longitudinal embossments 124 on the stationary contact fingers, the latch release bumper 125 engages the release tip 144 of latch spring 141 and forces it into the interior of tubular movable switch member 120. This allows sleeve 127 to be released and move a slight distance until it engages the latch release bumper 125 as seen in dotted lines in FIG. 9, in which position the re-entrant tubular portion 136 is above the release tip 144 and the latch spring 141 will thus be prevented from re-latching the sleeve 127 when the switch 16 is opened.

Figure 8:
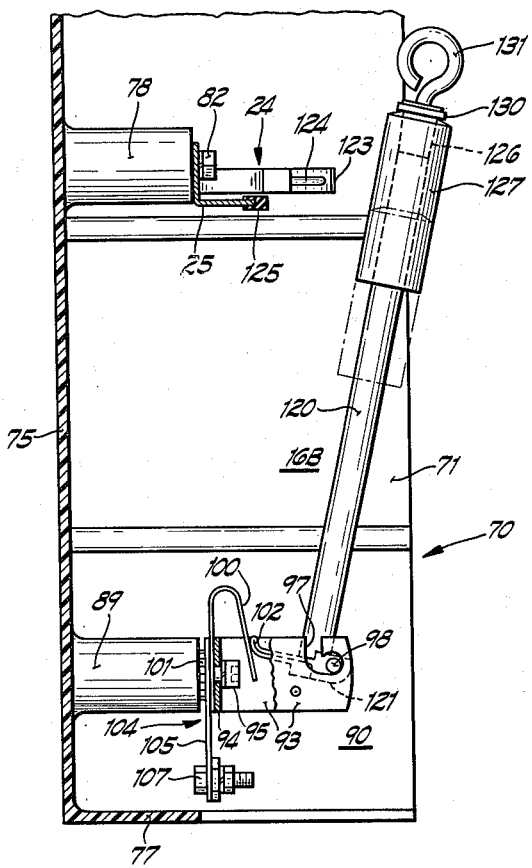
FIG. 8 is a view taken on line 8—8 of FIG. 6 with the load break disconnect switch in open position.

In closed position of switch 16, current flows from line terminal 104 through contact spring 100, contact finger 102, tubular movable switch member 120, and stationary jaw contact 24 to the bus bar 25. When it is desired to interrupt the current through switch 16, a hookstick is engaged with pulling eye 131 and the movable member 120 is pivoted about hinge contact 90. As the movable member is actuated away from latch release bumper 125, sleeve 127 is moved upwardly by spring 128 until the end wall 135 thereof engages the stationary contact jaw 24. Further rotation of movable switch member 120 disengages it from stationary jaw 24 so that an arc will be struck therebetween. The longitudinal embossments 124 on the stationary contact fingers necessitate that sufficient force be exerted on movable switch member 120, in order to overcome the spring force, so that member 120 cannot be released gradually but rather is snapped to open position. Continued pivoting of movable switch member 120 disengages sleeve 127 from stationary jaw contact 24 so that sleeve 127 is snapped upward by spring 128 into its closure position wherein it engages stop flange 130 on plug 126 as shown in FIG. 8. As the sleeve 127 moved upward over plug 126, the arc between stationary jaw contact 24 and movable switch member 120 is confined to a continually reduced surface area of movable member 120 until the arc is extinguished as the upper end of sleeve 127 moves over plug 126. The tapered, or frustoconical, contour of plug 126 results in squeezing the arc between plug 126 and the tubular re-entrant portion 136 of sleeve 127 with the result that current is interrupted in one or two cycles. It will also be appreciated that in the open switch position, the entire movable blade 120 is covered with insulation, thus minimizing the clearances required to withstand impulse voltage and removing a hazard to the lineman.

Disconnecting fuse 23 is similar to sectionalizing switch 16 except that a current limiting sand fuse 150 (see FIG. 10) replaces the lower end of the movable switch member, or switch blade. Fuse 150 may include a fusible element comprising a plurality of silver alloy wires or ribbons 152 helically wound on a spider 153 of suitable insulating material such as porcelain. Spider 153 may be reduced in diameter at both ends and extend into and be secured by suitable means such as epoxy cement at its lower end to a lower tubular metallic member 155 carrying the hinge member 121 and at its upper end to an upper tubular metallic member 156 secured to plug 126. The movable switch member, or blade, of fuse disconnect 23 thus includes members 155 and 156, spider 153, and plug 126. The fusible elements 152 may be electrically connected at their ends to upper and lower members 156 and 155 by suitable means such as solder. An outer tube 158 of suitable insulating material such as glass fiber impregnated with an epoxy resin may surround spider 153 and protrude freely into sleeve 127. Annular gaskets 159 of insulating material may be disposed between upper and lower tubular members 156 and 155 and the internal surface of outer tube 158 to seal the ends of the fuse and be secured thereto by suitable adhesive such as epoxy cement 157. The gasket 159 at the upper end of the fuse is prevented from moving downwardly by outwardly extending fingers 161 formed at the lower end of metallic upper tubular member 156, and spring 128 is compressed between this upper gasket 159 affixed by the epoxy cement ring 157 and the end wall 135 of the sleeve 127. Disposed within the outer tube 158 and embedding the spider 153 and the fusible wires 152 is a body of inert, or refractory, arc quenching material of high dielectric strength such as sand or finely divided quartz 160. When subjected to an over-current condition, the fusible elements 152 attain fusing temperature and vaporize, whereupon arcing occurs and the metal vapors expand rapidly to many times the volume originally occupied by the fusible wires 152 and are thrown into the spaces between the granules of sand 160 where they condense and are no longer available for current conduction. The physical contact between the hot arc and the relatively cool granules causes a rapid transfer of heat from the arc to the granules, thereby dissipating most of the arc energy with very little pressure buildup within outer tube 158, with no evolution of hot exhaust gases exterior of the fuse, and very little noise. The current limiting sand fuse, in effect, inserts a high resistance into the path of the current which initially limits the current to a magnitude which is only a small fraction of the available system short circuit current, and the inserted resistance increases rapidly and results in rapid decay of current and subsequent interruption of the arc with negligible generation of gas and noise. It will be appreciated that the current limiting fuse 150 greatly reduces the mechanical forces and arc energy present during interruption of system fault current in comparison to prior art construction.

Disconnect fuse 23 may be engaged by a hookstick and actuated to open position to interrupt transformer primary current under load by squeezing the arc between plug 126 and the sleeve 127 in the same manner as sectionalizing switches 16A and 16B, thereby permitting the transformer to be isolated without the use of auxiliary load break devices and without disturbing the incoming and outgoing cable connections and without evolution of dangerous hot exhaust gases.

A front insulating cover 162 (see FIG. 4) for the high voltage switching compartment 15 supported on lugs 163 welded to the side wall 44 and to metallic sheet barrier 19 between the primary compartment 15 and the low voltage compartment 26 may easily be removed by first lifting it clear of the lower lugs 163 and then moving it outwardly and down. The sheet metal barrier 19 prevents deterioration and warping as often occurred with prior art apparatus having barriers of insulating material, and yet the barrier 19 introduces no hazard of shock to the lineman because the disconnect switches 16A and 16B and fuse 23 are mounted in a fully insulated housing 71. Sheet metal barrier 19 may be welded to the plate portion 36 and to the upper horizontal wall portion 48 of Z-shaped member 47. Metallic housing 10 may be positively grounded by a conductor (not shown) connected at one end to spade terminal 37 and extending through conduit 30 or conduit opening 62 and connected at the other end to a ground rod (not shown) driven into the earth. A separate ground lug 164 may be welded to plate portion 36 (see FIG. 4).

Although only a single embodiment of the invention has been illustrated and described, the invention is applicable to other arrangements of the molded insulating switch housing and load break switches and fuses such as dry type transformers; gas filled transformers; ground level transformers wherein the low voltage compartment occupies a different position relative to the primary compartment, for example, at right angles thereto, and containing other components such as secondary breakers and meters; and service entrances to buildings. Many other modifications and variations of the invention will be readily apparent to those skilled in the art, and consequently it is intended in the appended claims to cover all such modifications and variations which fall within the true spirit and scope of the invention.

I claim:

1. In a ground level distribution transformer supported on a concrete pad, a unitary metallic housing adapted to be supported on said concrete pad and having a transformer-containing compartment and a switching compartment isolated from said transformer-containing compartment, said housing comprising a U-shaped sheet metal member disposed in vertical planes and adapted to rest on said concrete pad and a generally Z-shaped sheet metal member disposed within said U-shaped member and having the mid-piece in a vertical plane and welded at its edges intermediate the ends of the legs of said U-shaped member and also having upper and lower end pieces integral with said mid-piece and disposed in vertically spaced apart horizontal planes and welded along their edges to the interior periphery of said U-shaped member, said transformer-containing compartment being defined by the bight portion of said U-shaped member and said mid-piece and said lower end piece of said Z-shaped member, said mid-piece forming a common wall for said switching and transformer-containing compartments, said switching compartment being defined by said mid-piece and upper end piece of said Z-shaped member and by the portion of the legs of said U-shaped member beyond said mid-piece.

2. In a ground level distribution transformer supported on a concrete pad, a metallic housing adapted to be supported on said pad and having a transformer-containing compartment and a switching compartment, said housing including a unitary assembly formed by a generally U-shaped sheet metal member and a generally Z-shaped sheet metal member, said U-shaped member being disposed in vertical planes and adapted to rest on said concrete pad and said Z-shaped member being disposed within said U-shaped member and having the mid-piece in a vertical plane and welded at its edges intermediate the ends of the legs of said U-shaped member and also having upper and lower end pieces transverse to and integral with said mid-piece and disposed in vertically spaced apart horizontal planes and welded along their edges to the interior periphery of said U-shaped member, said transformer-containing compartment being defined by said U-shaped member and by said mid-piece and said lower end piece of said Z-shaped member, said mid-piece forming a common wall for said switching and transformer-containing compartments and said switching compartment being defined by said mid-piece and upper end piece of said Z-shaped member and the portion of the legs of said U-shaped member outward from said mid-piece, said housing also including an inverted L-shaped sheet metal cover having one leg thereof in a vertical plane closing the open end of said U-shaped member and covering said switching compartment and a second leg in a horizontal plane covering said transformer-containing compartment.

3. In a ground level distribution transformer supported on a concrete pad, in combination, a metallic housing having transformer-containing and switching compartments and including a unitary assembly adapted to rest of said concrete pad formed by a generally U-shaped sheet metal member disposed in vertical planes and a generally Z-shaped sheet metal member disposed within said U-shaped member and having the mid-piece in a vertical plane and welded at its edges intermediate the ends of the legs of said U-shaped member and also having upper and lower horizontal end pieces integral with and transverse to said mid-piece welded along their edges to said U-shaped member, a sill of angle cross section disposed across the open end of U-shaped member and adapted to rest on said concrete pad, means for releasably securing said sill to said U-shaped member, a cover of inverted L-shape having a vertical leg closing the open end of said U-shaped member and said switching compartment and a horizontal leg covering said transformer-containing compartment, and a member secured adjacent the lower end of said vertical leg and having a portion offset from said vertical leg adapted to fit over said sill and releasably secure said vertical leg to said unitary assembly.

4. In a ground level distribution transformer, in combination, a concrete pad, a metallic housing mounted on said concrete pad and having a transformer-containing compartment and a switching compartment, said housing including a unitary assembly formed by a generally U-shaped sheet metal member disposed in vertical planes and a generally Z-shaped sheet metal member disposed within said U-shaped member and having the mid-piece in a vertical plane and welded at its edges intermediate the ends of the legs of said U-shaped member and also having upper and lower horizontal end pieces transverse to said mid-piece and welded along their edges to said U-shaped member, said transformer-containing compartment being defined by the bight portion of said U-shaped member and by said mid-piece and said lower end piece of said Z-shaped member, said switching compartment being defined by said mid-piece and upper end piece of said Z-shaped member and the portion of the legs of said U-shaped member outward from said mid-piece, said mid-piece forming a common wall for said switching and transformer-containing compartments, a sill on said concrete pad positioned across the open end of said U-shaped member, anchor bolt means for affixing said sill to said concrete pad, means for releasably securing said sill to said U-shaped member, said housing also including an inverted L-shaped cover having a vertical leg closing the open end of said switching compartment and a horizontal leg covering said transformer-containing compartment, means adapted to fit over said sill for releasably securing said vertical leg of said cover to said sill, and means including an eye adapted to receive a padlock for releasably securing said horizontal leg of said cover to said unitary assembly.

5. In a ground level distribution transformer supported on a concrete pad, in combination, a unitary assembly adapted to rest on said concrete pad formed by a U-shaped sheet metal member disposed in vertical planes and a generally Z-shaped member disposed within and welded along its edges to said U-shaped member and having a vertical mid-piece intermediate the ends of the legs of said U-shaped member and upper and lower end pieces transverse to said mid-piece, said mid-piece and lower end piece and said U-shaped member jointly defining an open-ended compartment and said mid-piece and upper end piece and the portion of the legs of said U-shaped member beyond said mid-piece jointly forming a switching compartment, a sill disposed across the open end of said U-shaped member and adapted to rest on said concrete pad, means for releasably securing said sill to said U-shaped member, a horizontal hand hole cover closing said open-ended compartment, bolt means for securing said hand hole cover to said unitary assembly, a cover of inverted L-shape having a vertical leg closing the open end of said U-shaped member and said switching compartment and a horizontal leg disposed above said upper end piece and said hand hole cover, a member affixed adjacent the lower end of said vertical leg and having an offset portion adapted to fit over said sill for releasably securing said vertical leg to said sill, the edges of said cover being bent in vertical planes and overlapping the edges of U-shaped member and said bolt means, and means including a padlock-receiving eye for releasably securing said horizontal leg of said cover to said unitary assembly.

6. In a ground level distribution transformer, in combination, a concrete pad resting on the earth, a metallic housing supported on said concrete pad including a unitary assembly formed by a generally U-shaped sheet metal member disposed in vertical planes and a generally Z-shaped member disposed within said U-shaped member and having the mid-piece in a vertical plane and welded at its edges intermediate the ends of the legs of said U-shaped member and also having upper and lower horizontal end pieces transverse to said mid-piece and welded at their edges to said U-shaped member, said U-shaped member and said mid-piece and said lower end piece of said Z-shaped member defining a transformer-containing compartment, said mid-piece and said upper end piece of said Z-shaped member and the portions of the legs of said U-shaped member beyond said mid-piece defining a switching compartment, an insulating dielectric fluid within said transformer-containing compartment, a transformer core and coil assembly immersed in said fluid, a hand hole cover sealing said transformer-containing compartment, bolt means releasably securing said hand hole cover to said unitary assembly, said metallic housing also including an inverted L-shaped cover having a vertical leg closing the open end of said U-shaped member and covering said switching compartment and a horizontal leg covering said hand hole cover and said bolt means, and means including a padlock receiving eye for releasably securing said L-shaped cover to said unitary assembly.

7. In combination, a concrete pad at ground lever having conductor passage means therethrough, a grounded metallic housing on said concrete pad formed by a generally U-shaped member in vertical planes and a generally Z-shaped member disposed within and welded along its edges to said U-shaped member with the mid-piece thereof in a vertical plane and affixed intermediate the ends of the legs of said U-shaped member and jointly therewith defining a transformer-containing compartment and a switching compartment, insulating dielectric fluid within said transformer-containing compartment, a transformer core and coil assembly including a magnetic core linked by primary and secondary windings immersed in said fluid within said transformer-containing compartment, a box-like enclosure of high dielectric strength, antitracking insulating material having integral bottom and side walls disposed within said switching compartment, three disconnect switches supported in spaced apart relation within said insulating enclosure from said bottom wall, one of said switches being a current limiting disconnect fuse and being electrically connected at one end to said primary winding and at the other end to the other two disconnect switches, and incoming and outgoing underground primary cables extending through said conductor passage means into said switching compartment and being connected respectively to the other two disconnect switches, said bottom and side enclosure walls insulating said switches from said grounded metallic housing.

8. In a ground level distribution transformer, in combination, a concrete pad at ground level having conductor passage means therethrough, a unitary metallic housing supported on said concrete pad including a U-shaped sheet metal member and a generally Z-shaped sheet metal member disposed within said U-shaped member and having the mid-piece in a vertical plane and welded intermediate the ends of the legs of said U-shaped member and also having upper and lower end pieces integral with and transverse to said mid-piece welded along their edges to said U-shaped member, said mid-piece and lower end piece and said U-shaped member jointly forming a transformer-containing compartment, said mid-piece, said upper end piece, and the portions of the legs of said U-shaped member beyond said mid-piece forming a switching compartment, a sill on said concrete pad positioned across the open end of said U-shaped member, anchor bolt means for affixing said sill to said pad, bolt means for releasably securing said sill to said U-shaped member, an insulating dielectric fluid within said transformer-containing compartment, a transformer core and coil assembly including a magnetic core linked by primary and secondary windings immersed in said fluid within said transformer-containing compartment, a box-like enclosure of high dielectric strength insulating material mounted on said mid-piece within said switching compartment and having integral side and bottom walls, three disconnect switches in spaced apart relation within said insulating enclosure each of which includes a stationary contact supported from said bottom wall and a movable contact actuable into and out of engagement with said stationary contact, means for electrically commoning said stationary contacts of all of said switches, one of said switches being a current-limiting disconnect fuse, insulating bushing means having a conductive stud extending through said mid-piece and through the bottom wall of said insulating enclosure and being electrically connected to said primary winding and to said movable contact of said one switch, incoming and outgoing primary underground cables extending through said conductor passage means into said switching compartment and being respectively connected electrically to the movable contacts of the other two switches, said metallic housing also including an L-shaped cover having one vertical leg adapted to releasably engage said sill and close said switching compartment and a second horizontal leg adapted to cover said transformer-containing compartment.

9. In combination, a concrete pad at ground level having conductor passage means therethrough, a metallic housing supported on said pad and having a transformer-containing compartment and a switching compartment, said housing including a unitary assembly formed by a generally U-shaped sheet metal member disposed in vertical planes and a generally Z-shaped sheet metal member disposed within said U-shaped member and having the mid-piece in a vertical plane and secured at its edges intermediate the ends of the legs of said U-shaped member and also having upper and lower horizontal end pieces transverse to said mid-piece and secured along their edges to said U-shaped member, said transformer-containing compartment being defined by the bight portion of said U-shaped member and by said mid-piece and said lower end-piece of said Z-shaped member, said mid-piece forming a common wall for said switching and transformer-containing compartments, a transformer core and coil assembly including a magnetic core linked by primary and secondary windings within said transformer-containing compartment, a housing disposed adjacent said common wall within said switching compartment molded of a high dielectric strength insulating material comprising a water-insoluble binder and an arc suppressing, antitracking substance selected from the group consisting of the oxides and hydrates of aluminum and magnesium, three disconnect switches in spaced apart relation within said housing each of which includes a stationary jaw contact, a hinge contact spaced from said stationary jaw contact, and a movable contact pivotally mounted on said hinge contact for movement into and out of engagement with said stationary jaw contact, means for electrically commoning the stationary jaw contacts of all of said switches, means including an insulating bushing extending through said common wall and a metallic insert molded within said housing and accessible from the interior and the exterior of said housing for connecting one of said hinge contacts to said primary winding, said switch pivotally mounted on said one hinge contact being a current limiting disconnect fuse, said housing having barrier plate portions integral therewith disposed between said disconnect fuse and the other two switches, and underground incoming and outgoing primary cables extending through said conductor passage means in said concrete pad into said switching compartment and being electrically connected to said remaining two hinge contacts.

10. In combination, a concrete pad at ground level having conductor passage means extending therethrough, a grounded metallic housing supported on said concrete pad and having a sealed compartment and a switching compartment therein, an insulating dielectric fluid within said sealed compartment, a transformer core and coil assembly including a magnetic core linked by primary and secondary windings immersed in said dielectric fluid within said sealed compartment, an enclosure of high dielectric strength insulating material supported within said switching compartment, three disconnect switches mounted in spaced apart relation within said enclosure, each of which includes a stationary contact and a hinge contact affixed to said insulating enclosure and a movable member pivotally and releasably mounted on said hinge contact for movement into and out of engagement with said stationary conact, and being adapted to be mounted on any one of the three hinge contacts, means for electrically commoning said stationary contacts of all of said switches, one of said switches being a current limiting disconnect fuse having the hinge contact thereof connected to said primary winding, said enclosure insulating said switches from said grounded metallic housing and having baffle plate portions intergal therewith disposed between said switches, and incoming and outgoing underground primary cables extending through said conductor passage means into said switching compartment and being connected respectively to said hinge contacts of the other two switches.

11. In combination, a concrete pad at ground level having conductor passage means therethrough, a grounded metallic enclosure supported on said concrete pad and having a sealed compartment and a switch compartment therein, an insulating dielectric fluid within said sealed compartment, a transformer core and coil assembly including a magnetic core linked by primary and secondary windings immersed in said fluid within said sealed compartment, an insulating housing of high dielectric strength material supported within said switching compartment, three disconnect switches mounted in spaced apart relation within said insulating housing each of which includes a stationary contact, a movable contact member having a metallic portion and being mounted for movement of said metallic portion into and out of engagement with said stationary contact, an insulating sleeve telescoped over said movable member and slidable longitudinally thereof into and out of covering relation with said metallic portion, resilient means for urging said insulating sleeve toward covering relation with said metallic portion, said stationary contact being operable to prevent movement of said insulating sleeve into said covering relation when said movable member is in closed position in engagement with said stationary contact, actuation of said movable member to open position releasing said insulating sleeve for movement into covering relation with said metallic portion, whereby an arc drawn between said stationary contact and said metallic portion will be extinguished by said insulating sleeve, means for electrically commoning said stationary contacts of said three switches, one of said switches being a current limiting disconnect fuse and being connected to said primary winding, said housing insulating said switches from said grounded metallic enclosure, and incoming and outgoing underground primary cables extending through said conductor passage means in said concrete pad and being respectively electrically connected to said movable members of the other two disconnect switches.

12. In combination, a concrete pad at ground level having conductor passage means extending therethrough, a grounded metallic enclosure supported on said concrete pad and having a sealed compartment and a switching compartment therein, a transformer core and coil assembly including a magnetic core linked by primary and secondary windings within said sealed compartment, a box-like housing within said switching compartment having integral side and bottom walls and being of a high dielectric strength, anti-tracking and arc-suppressing insulating material comprising a water-insoluble binder and a substance selected from the class consisting of the hydrates and oxides of aluminum and magnesium, three load break disconnect switches supported in spaced apart relation within said insulating housing, each said switch including a stationary contact supported from said bottom wall, a movable switch member having a conductive portion movable into and out of engagement with said stationary contact, a sleeve of said anti-tracking and arc-suppressing insulating material slidably telescoped over said movable member for movement into and out of an arc extinguishing position wherein said insulating sleeve covers said conductive portion, and means for resiliently urging said sleeve toward said arc extinguishing position, said stationary contact being operable to hold said sleeve away from said arc extinguishing position when said movable switch member is in closed position with said conductive portion in engagement with said stationary contact and releasing said sleeve for movement toward said arc extinguishing position when said movable member is opened, means for electrically connecting said stationary contacts of all three switches, incoming and outgoing primary underground cables extending through said conductor passage means in said concrete pad into said switching compartment, one of said switches being a current limiting disconnect fuse and being electrically connected to said primary winding, said movable members of the other two switches being electrically connected to said incoming and outgoing primary cables, said side and bottom walls of said housing insulating said switches from said grounded metallic enclosure and said enclosure having integral baffle plate portions between said switches.

13. In combination, a concrete pad at ground level having conductor passage means extending therethrough, a grounded metallic enclosure supported on said concrete pad and having a sealed compartment and a switching compartment therein, a transformer core and coil assembly including a magnetic core linked by primary and secondary windings within said sealed compartment, incoming and outgoing primary underground cables extending through said conductor passage means in said concrete pad into said switching compartment, a box-like housing of high dielectric strength insulating material within said switching compartment having integral bottom and side walls isolating the interior of said housing from said grounded metallic enclosure, said housing having three upstanding posts integral with said bottom wall and upstanding baffle plate portions integral with said bottom wall disposed between said posts, three disconnect switches within said housing each of which includes a hinge contact supported on one of said posts, a stationary contact supported from said bottom wall in spaced relation to said post, and a movable contact having a conductive portion and being pivotally mounted on said hinge contact for movement of said conductive portion into and out of engagement with said stationary contact, one of said switches being a disconnect fuse and having the hinge contact thereof connected to said primary winding and said hinge contact of the other two switches being connected respectively to said incoming and outgoing primary cables, means for electrically commoning said stationary contacts of all three of said switches, each of said switches having load-break means including a sleeve of insulating material slidably telescoped over said movable contact and actuable, when said movable contact is actuated out of engagement with said stationary contact, into covering relation with said conductive portion of said movable contact.

14. In the combination defined by claim 13 wherein said insulating material of said housing and said sleeve is an anti-tracking and arc-suppressing composition comprising a water-insoluble binder and a substance selected from the group consisting of the hydrates and oxides of aluminum and magnesium.

15. In a ground level distribution transformer, in combination, a concrete pad at ground level having conductor passage means therethrough, a grounded metallic housing on said concrete pad having a sealed compartment and a switching compartment therein, a transformer core and coil assembly including a magnetic core linked by primary and secondary windings within said sealed compartment, an insulating dielectric fluid in said sealed compartment surrounding said core and coil assembly, an enclosure of high dielectric strength, anti-tracking insulating material within said switching compartment, three disconnect switches mounted in spaced apart relation within said insulating enclosure, one of said switches being a current-limiting disconnect fuse and being electrically connected at one end to said primary winding at the other end to the other two disconnect switches, and incoming and outgoing underground primary cables extending through said conductor pasage means into said switching compartment and being connected respectively to said other two disconnect switches, said enclosure having wall portions isolating said switches from said grounded metallic housing.

16. In a ground level distribution transformer, in combination, a concrete pad at ground level having conductor passage means therethrough, a grounded metallic housing on said concrete pad having a sealed compartment and a switching compartment therein, a transformer core and coil assembly including a magnetic core linked by primary and secondary windings within said sealed compartment, an insulating dielectric fluid in said sealed compartment surrounding said core and coil assembly.

an enclosure of high dielectric strength insulating material within said switching compartment, a current limiting disconnect fuse mounted in said enclosure and being electrically connected at one end to said primary winding, and a primary underground cable extending through said conductor passage means in concrete pad into said switching compartment and being electrically connected to the other end of said disconnect fuse.

17. In a ground level distribution transformer, in combination, a concrete pad at ground level having conductor passage means therethrough, a grounded metallic housing on said concrete pad having a sealed compartment and a switching compartment therein, a transformer core and coil assembly including a magnetic core linked by primary and secondary windings within said sealed compartment, an insulating dielectric fluid in said sealed compartment surrounding said core and coil assembly, an enclosure of high dielectric strength insulating material mounted on said metallic housing within said switching compartment and having integral bottom and side walls, a disconnect fuse supported from said bottom wall within said enclosure and being connected electrically at one end to said primary winding, a load-break disconnect switch within said enclosure supported from said bottom wall in spaced relation to said disconnect fuse and being electrically connected to the other end of said fuse, and a primary underground cable extending through said conductor passage means into said switching compartment and being electrically connected to said disconnect switch, said bottom and side walls of said enclosure isolating said switch and said fuse from said grounded metallic casing.

18. In a ground level distribution transformer, in combination, a concrete pad at ground level having conductor passage means therethrough, a grounded metallic housing on said concrete pad having a sealed compartment and a switching compartment therein, a transformer core and coil assembly including a magnetic core linked by primary and secondary windings within said sealed compartment, an insulating dielectric fluid in said sealed compartment surrounding said core and coil assembly, an enclosure of high dielectric strength, anti-tracking, arc-suppressing insulating material within said switching compartment and having integral bottom and side walls, three disconnect switches supported from said bottom wall in spaced apart relation within said enclosure, one of said switches being a current limiting disconnect fuse, means extending through said bottom wall for connecting one end of said disconnect fuse to said primary winding, means for connecting the other end of said disconnect fuse to said other two switches, and incoming and outgoing underground primary cables extending through said conductor passage means into said switching compartment and being connected respectively to said other two disconnect switches, each of said disconnect switches including a stationary contact supported from said bottom wall, a movable contact having a conductive portion and being actuable to move said conductive portion into and out of engagement with said stationary contact, and load break means including a sleeve of arc-suppressing insulating material slidably telescoped over said movable contact and being movable into covering relation with said conductive portion when said movable contact is actuated out of engagement with said stationary contact.

19. In combination, a concrete pad at ground level having conductor passage means therethrough, a grounded metallic enclosure supported on said concrete pad and having a sealed compartment and a switching compartment therein, a transformer core and coil assembly including a magnetic core linked by primary and secondary windings within said sealed compartment, an underground primary cable extending through said conductor passage means in said concrete pad into said switching compartment, a housing of high dielectric strength insulating material within said switching compartment, a pair of disconnect switches mounted in spaced apart relation within said housing, one of said switches being a current limiting disconnect fuse connected at one end to said primary winding, the second switch being connected between the other end of said disconnect fuse and said primary cable, each of said switches including a stationary contact and a movable contact provided with a metallic portion and being actuable between open and closed positions to move said metallic portion into and out of engagement with said stationary contact, an insulating plug at the end of said movable contact and adjacent said metallic portion, an insulating sleeve slidably telescoped over said movable contact, and means for retaining said sleeve in a position wherein said metallic portion is exposed and in engagement with said stationary contact when said movable contact is in closed position and for actuating said insulating sleeve into covering relation with said metallic portion and overlapping relation with said insulating plug when said movable contact is actuated to said open position, the axial opening in said insulating sleeve conforming closely to the contour of said plug so that minimum clearance is provided therebetween for continuation of an arc struck between said stationary contact and said metallic portion, said housing having wall portions integral therewith disposed between said grounded metallic enclosure and said switches.

20. In combination, a concrete pad at ground level having conductor passage means therethrough, a grounded metallic enclosure supported on said concrete pad and having a sealed compartment and a switching compartment with a common wall therebetween, a transformer core and coil assembly including a magnetic core linked by primary and secondary windings within said sealed compartment, incoming and outgoing primary underground cables extending through said conductor passage means in said concrete pad into said switching compartment, a molded housing of high dielectric strength insulating material having integral bottom and side walls supported within said switching compartment with said bottom wall adjacent said common wall of said metallic enclosure, three spaced apart disconnect switches within said housing each of which has a stationary contact supported from said bottom wall and a movable contact actuable into and out of engagement with said stationary contact, one of said switches being a current limiting disconnect fuse, means including a metallic insert molded in said housing and accessible from the exterior of said bottom wall and a conductive member engaging said insert and extending through said common wall for electrically connecting said movable contact of said disconnect fuse to said primary winding, the movable contact of the other two switches being connected to respectively said incoming and outgoing primary cables, and means for electrically commoning said stationary contacts of all three of said switches, said housing having baffle portions integral with said bottom wall disposed between said switches.

21. In combination, a concrete pad at ground level having conductor passage means therethrough, a grounded metallic enclosure supported on said concrete pad and having a sealed compartment and a switching compartment therein with a common wall therebetween having an aperture therethrough, a transformer core and coil assembly including a magnetic core linked by primary and secondary windings within said sealed compartment, a primary underground cable extending through said conductor passage means in said concrete pad into said switching compartment, a box-like housing within said switching compartment molded of an anti-tracking and arc-suppressing insulating material having high dielectric strength, said housing having integral bottom and side walls and a plurality of posts upstanding from said bottom wall and being disposed adjacent said common wall of said metallic enclosure, one of said posts having a metallic insert molded therein accessible from the interior and exterior of said housing and in alignment with said aperture, a plurality of disconnect switches within said housing each of which includes a hinge contact mounted on one of said posts, a stationary contact supported from said bottom wall in spaced relation to said hinge contact, and a movable contact pivotally mounted on said hinge contact for movement into and out of engagement with said stationary contact, the movable contact of said switch associated with said one post being a current limiting disconnect fuse and the hinge contact thereof being connected to said insert, insulating bushing means having a conductive stud engaging said insert and extending through said housing, said housing, also having baffle portions integral therewith disposed between said switches, and means for electrically commoning the stationary contacts of all of said switches, the movable contact of a second of said switches being connected to said primary cable.

22. Sectionalizing and protective means for an underground distribution system of the loop-feed type having incoming and outgoing underground primary cables to a distribution transformer provided with a magnetic core linked by primary and secondary windings, comprising a box-like housing of an anti-tracking, arc-suppressing, high dielectric strength insulating material comprising a water insoluble binder and a substance selected from the class consisting of the hydrates and oxides of magnesium and aluminum, said housing having integral bottom and side walls and three upstanding posts integral with said bottom wall and upstanding barrier plate portions integral with said bottom wall between said posts, said housing having at least one upstanding portion integral with said bottom wall in spaced relation to said posts, a metallic bus bar supported on said upstanding portion, three disconnect switches within said housing each of which includes a stationary contact electrically connected to said bus bar and supported on said upstanding portion, a hinge contact mounted on one of said posts, and a movable contact having a conducting portion and being pivotally mounted on said hinge contact for movement of said conductive portion into and out of engagement with said stationary contact, two of said switches carrying terminal means permitting connection to one of said primary cables and the third switch being a current-limiting disconnect fuse, said post supporting said hinge contact for said third switch being hollow and having a metallic member integral therewith connected to said hinge contact and exposed from the exterior of the bottom wall of said housing and permitting connection to said primary winding, each of said switches having load break means including a sleeve of said anti-tracking and arc-suppressing insulating material slidably telescoped over said movable member and actuable into covering relation with said conductive portion when said movable member is actuated out of engagement with said stationary contact.

23. Sectionalizing and protective means for an underground distribution system of the loop-feed type having incoming and outgoing primary underground cables to a distribution transformer, comprising a box-like housing of high dielectric strength insulating material having integral bottom and side walls, three disconnect switches within said housing each of which includes a stationary contact supported from said bottom wall and a hinge contact spaced from said stationary contact and supported from said bottom wall and a movable contact having a conductive portion and being pivotally and releasably mounted on said hinge contact for movement of said conductive portion into and out of engagement with said stationary contact, said movable contact being adapted to be mounted on any one of the three hinge contacts, two of said switches carrying terminal means permitting connection to one of said primary cables and the third switch being a current-limiting disconnect fuse and having terminal means permitting connection to the primary winding of said distribution transformer, means for electrically commoning said stationary contacts of all three disconnect switches, each of said switches having load-break means including an insulating sleeve slidably telescoped over said movable contact and actuable into covering relation with said conductive portion when said movable member is actuated out of engagement with said stationary contact into open position.

24. Sectionalizing and protective means for an underground distribution system of the loop-feed type having incoming and outgoing underground primary cables to a distribution transformer comprising, in combination, a box-like housing of high dielectric strength, anti-tracking insulating material having integral bottom and side walls and three upstanding posts integral with said bottom wall and baffle plate portions integral with said bottom wall between said posts and an upstanding support portion integral with said bottom wall and spaced from said posts, three disconnect switches within said housing each of which includes a stationary contact mounted on said support portion, a hinge contact mounted on one of said posts, and a movable contact having a conductive portion and being pivotally mounted on said hinge contact for movement of said conductive portion into and out of engagement with said stationary contact, one of said switches being a current limiting disconnect fuse, means for electrically commoning said stationary contacts of all of said switches, each of said switches having load break means including an insulating sleeve slidably telescoped over said movable contact for movement into and out of an arc extinguishing position wherein it covers said conductive portion, resilient means for urging said insulating sleeve towards said arc extinguishing position, latch means for holding said insulating sleeve out of said position against the bias of said resilient means, said latch means being released when said movable contact is disengage from said stationary contact and permiting said insulating sleeve to move into said arc extinguishing position in covering engagement with said conductive portion.

25. Sectionalizing and protective means for an underground distribution system of the loop-feed type having incoming and outgoing primary underground cables to a distribution transformer comprising, in combination, a box-like housing of high dielectric strength insulating material having integral bottom and side walls and spaced apart upstanding baffle plate portions integral with said bottom wall, three disconnect switches within said housing each of which includes a hinge contact supported from said bottom wall adjacent one of said baffle plate portions, a stationary contact supported from said bottom wall in spaced relation to hinge contact, and a movable member having a conductive portion and being pivotally mounted on said hinge contact for movement of said conductive portion into and out of engagement with said stationary contact and also including an insulating plug disposed at the end of said movable member adjacent said conductive portion and being tapered outward therefrom, an insulating sleeve slidably telescoped over said movable member means resiliently urging said sleeve toward said plug and into covering relation with said conductive portion, latch means for holding said insulating sleeve away from said conductive portion, and latch release means mounted on said stationary contact for releasing said latch means when said movable member is moved into closed position in engagement with said stationary contact, actuation of said movable member out of engagement with said stationary contact into open position releasing said sleeve for movement over said plug and into covering relation with said conductive portion, the opening in said sleeve corresponding closely to the contour of said plug so that minimum clearance is provided therebetween for continuation of an arc struck between said stationary contact and said conductive portion, and means for electrically commoning said stationary contacts of all three of said switches, one of said switches being a current-limiting disconnect fuse.

References Cited by the Examiner

UNITED STATES PATENTS

| | | | |
|---|---|---|---|
| 2,023,154 | 12/1935 | Trotter | 312—141 |
| 2,325,186 | 7/1943 | Larson | 175—307 |
| 2,361,179 | 10/1944 | DeMask | 175—307 |
| 2,752,413 | 6/1956 | Junkins | 174—50 |
| 3,014,158 | 12/1961 | Nelson et al. | 317—50 |

FOREIGN PATENTS 648,658   9/1962   Canada.

ROBERT K. SCHAEFER, *Primary Examiner.*

KATHLEEN H. CLAFFY, *Examiner.*

H. J. RICHMAN, *Assistant Examiner.*